United States Patent
Tachibana (10) Patent No.: US 8,999,535 B2
(45) Date of Patent: Apr. 7, 2015

(54) PERPENDICULAR MAGNETIC RECORDING MEDIA

(75) Inventor: Toshiaki Tachibana, Singapore (SG)

(73) Assignee: WD Media (Singapore) PTE, Ltd, Singapore (SG)

( * ) Notice: Subject to any disclaimer, the term of this patent is extended or adjusted under 35 U.S.C. 154(b) by 133 days.

(21) Appl. No.: 13/149,540

(22) Filed: May 31, 2011

(65) Prior Publication Data

US 2012/0140359 A1     Jun. 7, 2012

(30) Foreign Application Priority Data

May 28, 2010  (JP) ................. 2010-122587

(51) Int. Cl.
 *G11B 5/73*  (2006.01)
 *G11B 5/82*  (2006.01)
 G11B 5/84  (2006.01)

(52) U.S. Cl.
 CPC ............ *G11B 5/7315* (2013.01); *G11B 5/8404* (2013.01); *G11B 5/82* (2013.01)

(58) Field of Classification Search
 CPC ....... G11B 5/7315; G11B 5/82; G11B 5/8404
 USPC ........... 428/848, 848.2, 827, 826, 828.1, 128, 428/163, 64.2, 631; 216/91; 360/135; 451/60, 171
 See application file for complete search history.

(56) References Cited

U.S. PATENT DOCUMENTS

| | | | | | |
|---|---|---|---|---|---|
| 4,973,496 | A | * | 11/1990 | Kruger et al. | 428/848.2 |
| 5,478,622 | A | * | 12/1995 | Nakamura et al. | 428/848.2 |
| 5,540,973 | A | * | 7/1996 | Onodera et al. | 360/135 |
| 5,605,733 | A | * | 2/1997 | Ishikawa et al. | 428/828 |
| 5,853,847 | A | * | 12/1998 | Takahashi | 428/141 |
| 6,320,728 | B1 | * | 11/2001 | Xuan et al. | 360/135 |
| 6,942,933 | B2 | * | 9/2005 | Osawa | 428/827 |
| 2003/0203244 | A1 | * | 10/2003 | Isono et al. | 428/848 |
| 2005/0287933 | A1 | * | 12/2005 | Maeda | 451/41 |
| 2006/0000809 | A1 | * | 1/2006 | Matsumoto | 216/91 |

(Continued)

FOREIGN PATENT DOCUMENTS

| | | | | |
|---|---|---|---|---|
| JP | 04-349218 | * | 12/1992 | G11B 5/85 |
| JP | 2006-024346 | | 1/2006 | |

(Continued)

OTHER PUBLICATIONS

Translation Showa Denko KK, JP 2008-176825, Jul. 31, 2008.*

(Continued)

*Primary Examiner* — Kevin M. Bernatz (57) ABSTRACT

[Problem] An object is to provide a perpendicular magnetic recording medium in which a narrower track width is achieved by enhancing an exchange coupling magnetic field Hex of a soft magnetic layer so that a higher recording density can be achieved.

[Solution] A perpendicular magnetic recording medium according to the present invention is configured to include a magnetic recording layer 122 that records a signal, and a soft magnetic layer 114 provided below the magnetic recording layer, on a base 110 on a main surface of which textures are formed, wherein the textures includes first textures 110*a* that is linear rails in a certain direction, and second textures 110*b* that are trails intersecting at a predetermined angle with the first textures; and the angle of intersection between the first textures and the second textures is 10° or less.

2 Claims, 4 Drawing Sheets

(56) References Cited

U.S. PATENT DOCUMENTS

| | | | |
|---|---|---|---|
| 2006/0194080 A1* | 8/2006 | Ishii et al. | 428/64.2 |
| 2007/0217073 A1* | 9/2007 | Lee | 360/135 |
| 2008/0075982 A1* | 3/2008 | Shimada | 428/848 |
| 2008/0096052 A1* | 4/2008 | Matsuo et al. | 428/826 |
| 2009/0023016 A1* | 1/2009 | Tanahashi et al. | 428/828.1 |

FOREIGN PATENT DOCUMENTS

| | | | |
|---|---|---|---|
| JP | 2008090907 A * | 4/2008 | |
| JP | 2008-176825 | 7/2008 | |
| JP | 2008176825 A * | 7/2008 | |

OTHER PUBLICATIONS

T. Oikawa, et al. "Microstructure and Magnetic Properties of CoPtCr-SiO2 Perpendicular Recording Media", IEEE Transactions on Magnetics, v.38, iss.5, pp. 1976-1978 (Sep. 2002).

Japanese Office Action dated Apr. 22, 2014 for related Application No. 2010-122587, 4 pages.

English Translation of Japanese Office Action dated Apr. 22, 2014 for related Application No. 2010-122587, 3 pages.

* cited by examiner

|  | Ra[nm] | ANGLE OF INTERSECTION | Hex | MEW |
|---|---|---|---|---|
| EXAMPLE 1 | 0.085~0.090 | 1° | 142 | Std−3% |
| EXAMPLE 2 | 0.085~0.090 | 3° | 147 | Std−5% |
| EXAMPLE 3 | 0.085~0.090 | 5° | 148 | Std−5% |
| EXAMPLE 4 | 0.085~0.090 | 8° | 145 | Std−5% |
| EXAMPLE 5 | 0.085~0.090 | 10° | 141 | Std−3% |
| COMPARATIVE EXAMPLE 1 | 0.085~0.090 | 15° | 140 | Std |
| COMPARATIVE EXAMPLE 2 | 0.085~0.090 | 30° | 135 | Std+3% |

PERPENDICULAR MAGNETIC RECORDING MEDIA

TECHNICAL FIELD

The present invention relates to a perpendicular magnetic recording medium installed in an HDD (hard disk drive) of a perpendicular magnetic recording type.

BACKGROUND ART

With increase in capacity of information processing in recent years, various information recording technologies have been developed. In particular, the surface recording density of an HDD using a magnetic recording technology is continuously increasing at an annual rate of approximately 100%. Recently, an information recording capacity exceeding 200 gigabytes/platter with a 2.5-inch diameter of a magnetic recording medium for use in an HDD or the like has been demanded, and in order to satisfy such a demand, an information recording density exceeding 400 gigabytes/square inch is required to be realized.

In order to achieve high recording density in a magnetic recording medium for use in an HDD or the like, a perpendicular magnetic recording type has been suggested in recent years. In a perpendicular magnetic recording medium used for the perpendicular magnetic recording type, an easy axis of magnetization of a magnetic recording layer is adjusted so as to be oriented in a perpendicular direction with respect to a base plate surface. The perpendicular magnetic recording type is more suitable for increasing recording density than a conventional in-plane recording type, since the perpendicular magnetic recording type can suppress a so-called thermal fluctuation phenomenon that a recording signal is lost due to a superparamagnetic phenomenon impairing thermal stability of the recording signal.

As a magnetic recording medium used for the perpendicular magnetic recording type, a CoCrPt—$SiO_2$ perpendicular magnetic recording medium (see a non-patent document 1) has been suggested, since it has high thermal stability and a good recording property. This configures the magnetic recording layer to have a granular structure in which a nonmagnetic grain boundary is formed by segregating $SiO_2$ between magnetic particles of Co crystals having an hcp structure (hexagonal close-packed crystal lattice) and grown continuously in columns, so that refinement of the magnetic particles and improvement in coercive force Hc are achieved together. It is known that an oxide is used for the nonmagnetic grain boundary (a nonmagnetic part between the magnetic particles), and it is suggested that either one of $SiO_2$, $Cr_2O_3$, TiO, $TiO_2$, and $Ta_2O_5$ is used, for example (patent document 1).

In the above perpendicular magnetic recording type, a perpendicular head of a single magnetic pole type is used as a magnetic head to generate a magnetic field in a perpendicular direction with respect to the magnetic recording layer. However, a magnetic field with sufficient intensity cannot be applied to the magnetic recording layer simply by using only the perpendicular head of a single magnetic pole type, since magnetic flux which has left a single magnetic pole end part immediately tries to return to a return magnetic pole on the opposite side. Therefore, an intensive magnetic field in a perpendicular direction is applied to the magnetic recording layer by providing a soft magnetic layer below the magnetic recording layer of a perpendicular magnetic recording disk to form a magnetic path in the soft magnetic layer. That is, the soft magnetic layer is a layer whose direction of magnetization is aligned according to a magnetic field (magnetizing filed) at the time of writing so that a magnetic path is formed dynamically.

As described above, the soft magnetic layer is a layer utilized at the time of writing, the direction of magnetization of which is aligned along a magnetic field at the time of writing. At the time of reading, however, a magnetic field that aligns the direction of magnetization is not applied to the soft magnetic layer, and therefore, in principle, the direction of magnetization is dispersed in irregular directions. The irregular directions are three-dimensional directions, and, if the direction of magnetization of the soft magnetic layer includes a perpendicular component, the component may be picked up as noise together with a signal of the magnetic recording layer at the time of reading by the magnetic head.

Therefore, regarding the soft magnetic layer, an AFC (Antiferro-magnetic exchange coupling) structure where the soft magnetic layer is split into two layers and a nonmagnetic spacer layer is interposed therebetween has been suggested and practiced. In the AFC structure, a lower layer and an upper layer are coupled and fixed by mutual attraction due to reversal of their directions of magnetization (exchange coupling). Therefore, the directions of magnetization of the respective soft magnetic layers at a non-application time of magnetic field become antiparallel to each other (parallel and opposite to each other), that is, they become parallel to a main surface of a base plate. This reduces the perpendicular components extremely so that the noise generated from the soft magnetic layer can be reduced.

The strength of exchange coupling in the AFC structure is expressed by an exchange coupling magnetic field Hex. Since a stronger Hex makes the direction of magnetization of the soft magnetic layer less susceptible to an external magnetic field, and accordingly formation of a flux path due to a leakage magnetic field can be prevented, the SNR (signal-noise ratio) can be improved.

PRIOR ART DOCUMENT

Patent Document

Patent Document 1: Japanese Unexamined Patent Application Publication No. 2006-024346

Non-Patent Document

Non-patent Document 1: T. Oikawa et al., IEEE Trans. Magn, vol. 38, 1976-1978 (2002)

SUMMARY OF THE INVENTION

Problem to be Solved by the Invention

Though having increased in recording density in the above manner, the magnetic recording medium is required to be further improved in recording density in the future. Important factors in increasing the recording density include improvement in static magnetic property, such as coercive force Hc or an inverted magnetic domain nucleation magnetic field Hn, and improvement in electromagnetic conversion characteristic, such as an overwrite characteristic (OW characteristic), an SNR (signal-noise ratio), or narrowing of a track width. Among them, by achieving a narrower track width, the recording density of the magnetic recording medium can be dramatically improved.

In order to achieve a narrower track width, it is necessary to reduce "side fringing" that occurs at the time of writing a signal into the magnetic recording medium. The "side fringing" is a phenomenon that the direction of magnetization is reversed even in a track adjacent to a track on which a signal should be written by leakage flux from the magnetic head when the signal is written onto a track of the magnetic recording medium, so that a signal on the adjacent track is rewritten. Therefore, the magnetic recording medium in which the "side fringing" tends to occur must secure a wide width between tracks in order to avoid the "side fringing", which obstructs narrowing of the track width.

The "side fringing" is effectively reduced by tightening the exchange coupling in the AFC structure of the soft magnetic layer described above, that is, enhancing the exchange coupling magnetic field Hex. Specifically, by enhancing the exchange coupling magnetic field Hex, magnetic flux passing through the soft magnetic layer from the magnetic head is converged so that flux density can be increased. This reduces the leakage flux, thereby reducing the "side fringing".

Therefore, in order to reduce the "side fringing" so that a narrower track width and thus a higher recording density of the magnetic recording medium is achieved, as described above, the exchange coupling magnetic field Hex of the soft magnetic layer must be enhanced. In the main stream AFC structure of the soft magnetic layer, however, the magnitude of the exchange coupling magnetic field Hex is not necessarily sufficient.

In view of such a problem, an object of the present invention is to provide a perpendicular magnetic recording medium in which a narrower track width is achieved by enhancing an exchange coupling magnetic field Hex of a soft magnetic layer so that a higher recording density can be achieved.

Means to Solve the Problem

The present inventor has carefully examined magnetic recording media in order to solve the above problem, and has found that the direction of magnetization of a soft magnetic layer is affected by a magnetic field of a rotary magnet used when the soft magnetic layer is formed by DC magnetron sputtering (referred to shortly as sputtering below). That is, an easy axis of magnetization of the soft magnetic layer formed is dispersed in irregular directions, because the magnetic field is applied to a base from multi-directions due to rotation of the rotary magnet when the soft magnetic layer is formed.

At this time, perpendicular components of the easy axis of magnetization (perpendicular direction of magnetization) are reduced by AFC, but horizontal components (horizontal directions of magnetization) remain irregular. Therefore, the present inventor has thought that the strength of AFC might be increased by orienting the horizontal components of the easy axis of magnetization in a predetermined direction.

Then, as a result of accumulated studies, the present inventor has focused on the fact that shape magnetic anisotropy is generated in a layer formed on the base according to the shape of the base, has found that the above problem can be solved by aligning the horizontal components of the easy axis of magnetization of the soft magnetic layer in a predetermined direction by forming the base into such a shape as causes shape magnetic anisotropy in the soft magnetic layer, and has completed the present invention.

That is, in order to solve the above problem, a perpendicular magnetic recording medium according to the present invention is typically configured to include a magnetic recording layer that records a signal thereon, and a soft magnetic layer provided below the magnetic recording layer, on a base on a main surface of which textures has been formed, wherein the textures comprise first textures that are linear trails in a certain direction, and second texture that are trails intersecting at a predetermined angle with the first textures; and the angle of intersection between the first textures and the second textures is 10° or less, further preferably, between 3° and 8°.

According to the above configuration, the cross-like textures (cross textures) that are formed on the main surface of the base and that are composed of the first textures and the second textures causes the soft magnetic layer to have shape magnetic anisotropy. Therefore, horizontal components of an easy axis of magnetization of the soft magnetic layer can be aligned in a predetermined direction. Further, by setting the angle of intersection between the first textures and the second textures at 10° or less, more preferably between 3° and 8°, the predetermine direction is caused to coincide with a circumferential direction of the base. Therefore, it becomes possible to orient the horizontal components of the easy axis of magnetization of the soft magnetic layer in the circumferential direction of the base, and accordingly the exchange coupling magnetic field Hex is enhanced so that narrowing of the track width and eventually further higher recording density can be achieved.

It is preferred that the surface roughness Ra of the above base be between 0.085 nm and 0.090 nm. If 0.085 nm or less, formation of the texture becomes insufficient, and therefore the effect described above cannot sufficiently be obtained. On the other hand, if 0.090 nm or more, the surface roughness of the base is succeeded by the magnetic recording layer, which causes reduction in crystal orientation of magnetic particles of the magnetic recording layer. Therefore, setting the surface roughness of the base in the above range makes it possible to obtain the effect described above sufficiently while avoiding adverse effects on the magnetic recording layer.

It is preferred that the textures be formed by relative movement between the base and a polishing tape that polishes the main surface of the base. Such a configuration makes it possible to form the texture on the base suitably.

Effects of the Invention

According to the present invention, it is possible to provide a perpendicular magnetic recording medium in which a narrower track width is achieved by enhancing an exchange coupling magnetic field Hex of a soft magnetic layer so that a higher recording density can be achieved.

EMBODIMENT OF THE INVENTION

In the following, with reference to the attached drawings, a preferred embodiment of the present invention will be described in detail. Dimensions, materials, and other specific numerical values shown in the embodiment are merely examples to facilitate understanding of the invention, and are not meant to restrict the present invention unless otherwise specified. Note that, in this specification and drawings, components having substantially the same functions and structures are provided with the same reference characters and are not redundantly described, and components not directly relating to the present invention are not shown in the drawings.
(Embodiment)
<Perpendicular Magnetic Recording Medium>

Figure 1:
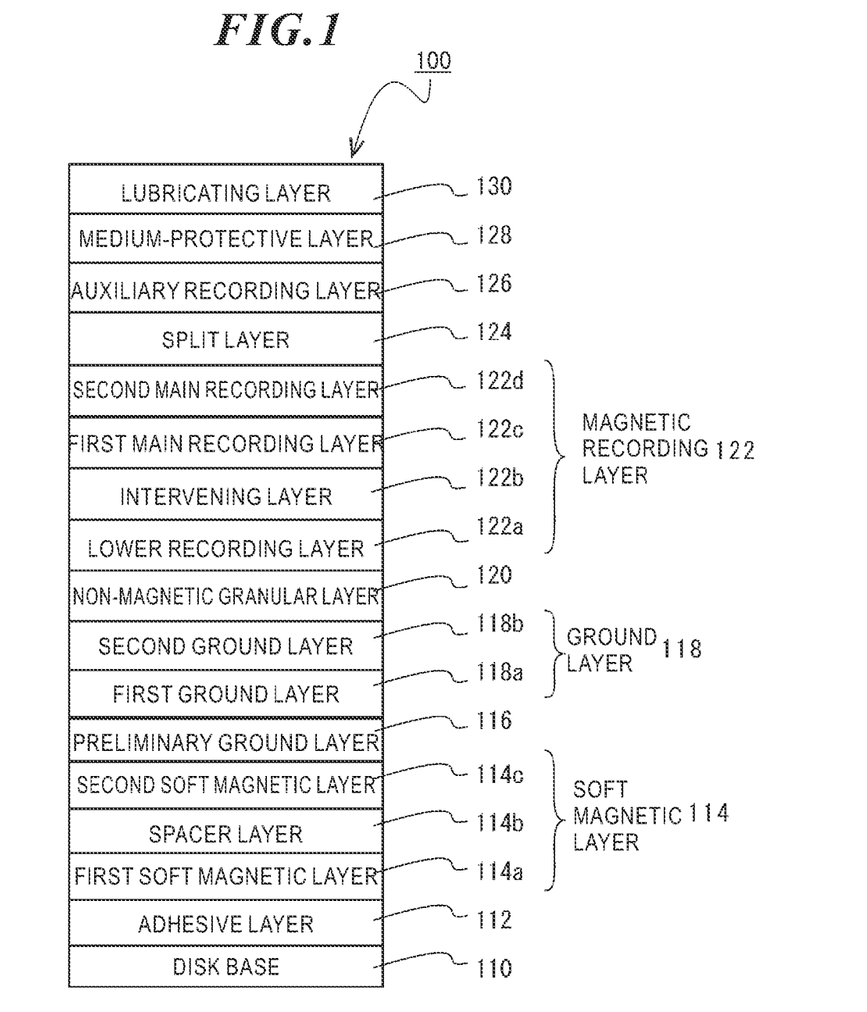
FIG. 1 is a diagram for describing the configuration of a perpendicular magnetic recording medium according to an embodiment of the present invention.

FIG. 1 is a diagram for describing the configuration of a perpendicular magnetic recording medium 100 according to this embodiment. The perpendicular magnetic recording medium 100 shown in FIG. 1 includes a disk base 110, an adhesive layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a lower recording layer 122a, an intervening layer 122b, a first main recording layer 122c, a second main recording layer 122d, a split layer 124, an auxiliary recording layer 126, a medium-protective layer 128, and a lubricating layer 130. Note that the first soft magnetic layer 114a, the spacer layer 114b, and the second soft magnetic layer 114c together form a soft magnetic layer 114. The first ground layer 118a and the second ground layer 118b together form a ground layer 118. The lower recording layer 122a, the intervening layer 122b, the first main recording layer 122c, and the second main recording layer 122d together form a magnetic recording layer 122.

As the disk base 110, a glass disk molded in a disk shape by direct-pressing amorphous aluminosilicate glass can be used. Note that the kind, size, thickness, and others of the glass disk are not particularly restricted. A material of the glass disk can be, for example, aluminosilicate glass, soda lime glass, soda aluminosilicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing a smooth non-magnetic disk base 110 made of a chemically-strengthened glass disk to be obtained.

Figure 2:
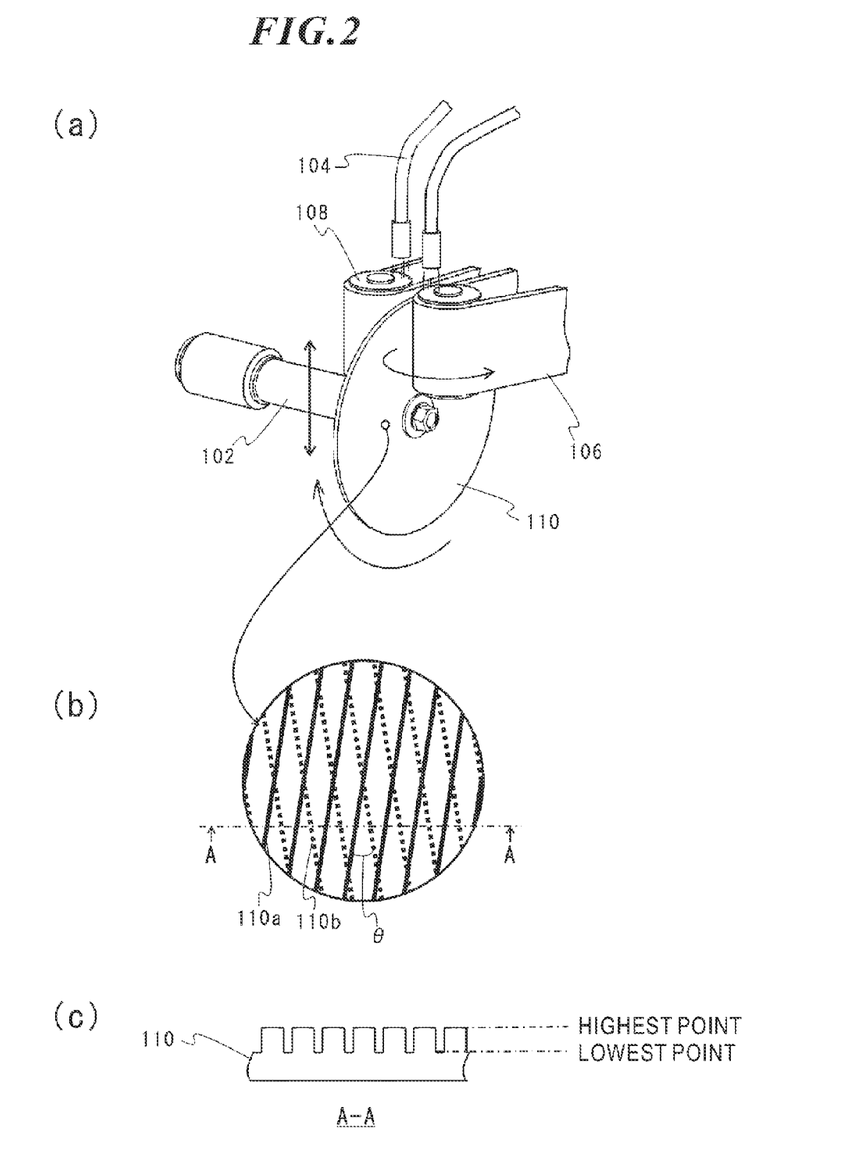
FIGS. 2A to 2C are diagrams for describing texture formation on a disk base.

In this embodiment, textures are formed on a main surface of the disk base 110. FIGS. 2A to 2C are diagrams for describing texture formation on the disk base 110. FIG. 2A is a view for describing polishing of the main surface of the disk base 110 by a polishing tape, FIG. 2B is a partially-enlarged view of the main surface of the disk base 110, and FIG. 2C is a cross-sectional view of the partially-enlarged view of the disk base 110.

When textures are formed on main surfaces of the disk base 110, as shown in FIG. 2A, the disk base 110 is supported by a spindle 102 to be rotationally driven at a predetermined speed. Polishing solution including polishing material is discharged from slurry nozzles 104 and supplied to polishing tapes 106. The polishing tapes 106 are wound on rollers 108, and the rollers 108 press the polishing tapes 106 against both the main surfaces of the disk base 110. Then, the polishing tapes 106 are rewound in the opposite direction to a rotational direction of the disk base 110 at sites of contact with the disk base 110 so as to constantly bring their fresh faces into contact with the disk base 110. This causes the main surfaces of the disk base 110 to be polished in a rubbing manner, thereby forming textures.

Particularly, in this embodiment, by moving the spindle 102 in an axial direction of the rollers 108, that is, in a vertical direction, the disk base 110 supported on the spindle 102 and the polishing tapes 106 are relatively moved. Then, as shown in FIG. 2B, cross-like textures (cross textures) composed of first textures 110a that are linear trails in a certain direction (that are trails intersecting with a circumferential direction of the disk base 110 at a predetermined angle) and second textures 110b that are trails intersecting at a predetermined angle with the first textures (that are trails intersecting with the circumferential direction of the disk base 110 at a different angle than the first textures 110a) can suitably be formed on the disk base 110. This causes shape magnetic anisotropy in the soft magnetic layer 114 described later so that horizontal components of an easy axis of magnetization of the soft magnetic layer 114 can be aligned in a predetermined direction. Note that, in order to facilitate understanding, the second textures 110b are shown by broken lines in FIG. 2B, but they are actually linear grooves.

The first textures 110a are grooves formed by moving the disk base 110 downward rotationally, while the second textures 110b are grooves formed by moving the disk base 110 upward. The first textures 110a and the second textures 110b intersect at an angle of intersection (crossing angle) θ. The angle of intersection can be adjusted by adjusting the rotation speed of the disk base 110 (rotation speed of the spindle) and the period of relative movement between the disk base 110 and the polishing tapes 106.

In this embodiment, textures in which the angle of intersection between the first textures 110a and the second textures 110b is 10° or less are formed on the disk base 110. This makes a direction of alignment of the easy axis of magnetization of the soft magnetic layer 114 (the predetermined direction) substantially parallel to the circumferential direction of the disk base 110. Therefore, it becomes possible to orient the horizontal components of the easy axis of magnetization of the soft magnetic layer 114 in the circumferential direction of the disk base 110, so that narrowing of the track width and thus a higher recording density can be achieved by enhancing the exchange coupling magnetic field Hex.

A cross-section of the disk base 110 with the textures formed in the above manner has asperity (recessed parts and projected parts), as shown in FIG. 2C. Then, surface roughness Ra (mean arithmetic roughness) of the disk base 110 after texture formation can be calculated by measuring plural heights from the lowest points of the recessed parts to the highest points of the projected parts on the main surface of the disk base 110 and averaging them.

In this embodiment, the surface roughness Ra of the disk base 110 after texture formation is adjusted so as to fall within the range of 0.085 to 0.090 nm. This makes it possible to obtain a sufficient effect of the textures on the soft magnetic layer 114 while avoiding an adverse effect on the magnetic recording layer 122.

Note that, if the surface roughness Ra is 0.085 nm or less, the textures are insufficiently formed, which causes a failure to obtain the effect described above sufficiently, or if 0.090 nm or more, the surface roughness of the disk base 110 is inherited even by the magnetic recording layer 122, which causes reduction in crystalline orientation of magnetic particles of the magnetic recording layer 122, and therefore neither case is preferred.

On the disk base 110 with the textures formed in the above manner, the adhesive layer 112 to the auxiliary recording layer 126 are sequentially formed by DC magnetron sputtering, and the medium-protective layer 128 can be formed by CVD. Thereafter, the lubricating layer 130 can be formed by dip coating. Note that, in terms of high productivity, it is also preferred that an in-line type film forming method be used. A configuration of each layer will be described below.

The adhesive layer 112 is formed in contact with the disk base 110, and provided with a function of increasing delamination strength between the soft magnetic layer 114 formed thereon and the disk base 110, and a function of causing refinement and homogenization of crystal grains of each layer formed above the soft magnetic layer 114. If the disk base 110 is made of amorphous glass, it is preferred that the adhesive layer 112 be an amorphous alloy film so as to be adapted to the amorphous glass surface.

The adhesive layer 112 can be selected from, for example, a CrTi-type amorphous layer, a CoW-type amorphous layer, a CrW-type amorphous layer, a CrTa-type amorphous layer, or a CrNb-type amorphous layer. The adhesive layer 112 may be a single layer made of a single material, or it may also be formed by stacking plural layers. For example, a CoW layer or CrW layer may be formed on a CrTi layer. Further, it is preferred that these adhesive layers 112 be formed by sputtering with a material containing carbon dioxide, carbon monoxide, nitrogen, or oxygen, or by exposing a surface layer to these gases.

The soft magnetic layer 114 is a layer on which a magnetic path is temporarily formed at a recording time for causing magnetic flux to pass in a direction perpendicular to the magnetic recording layer 122 in a perpendicular magnetic recording system. As the compositions of the first soft magnetic layer 114a and the second soft magnetic layer 114c, a cobalt-type alloy, such as CoTaZr, an Co—Fe-type alloy, such as CoCrFeB or CoFeTaZr, an Ni—Fe-type alloy, such as an [Ni—Fe/Sn]n multilayer structure, or others can be used.

The soft magnetic layer 114 can be configured so as to include AFC (AntiFerromagnetic exchange coupling) by interposing the non-magnetic spacer layer 114b between the first soft magnetic layer 114a and the second soft magnetic layer 114c.

Figure 3:
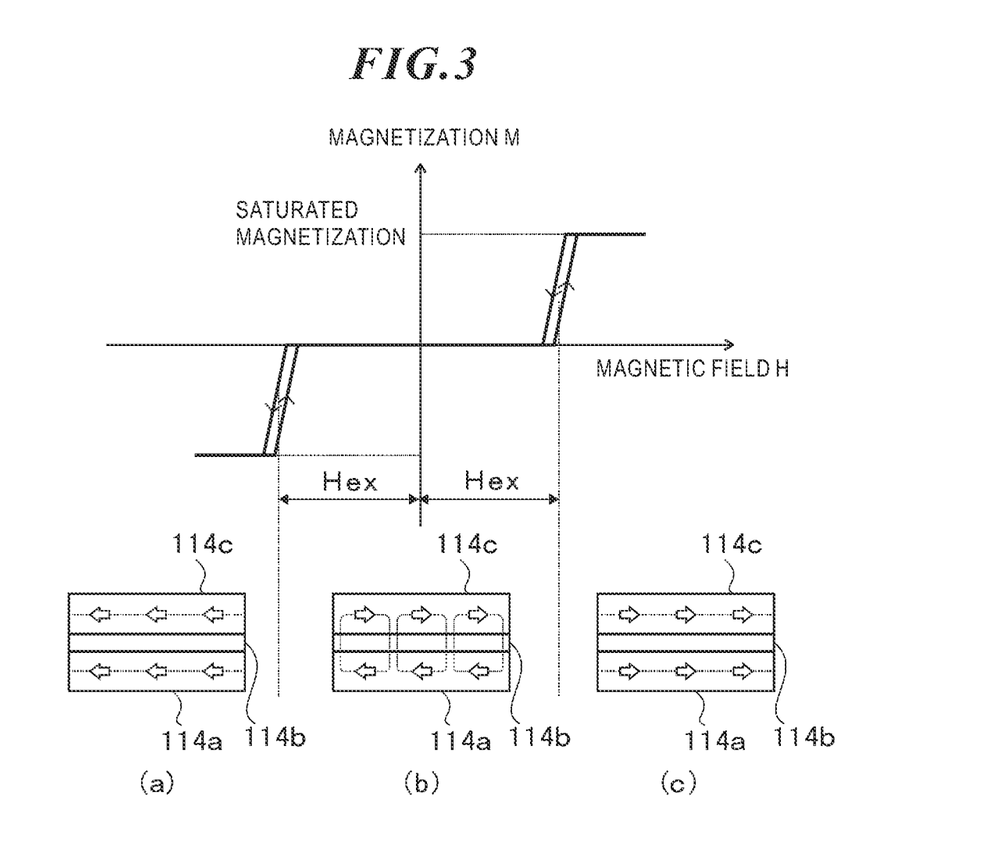
FIG. 3 is a diagram for describing magnetization characteristics due to an AFC structure.

FIG. 3 is a descriptive diagram for describing a magnetization characteristic due to the AFC structure. The coupling strength of the AFC structure depends on the exchange coupling magnetic field Hex shown in FIG. 3, and a larger Hex makes coupling (exchange coupling) of AFC stronger. The Hex is set so as to be magnetized by a magnetic field for writing on a corresponding magnetic recording layer 122, and so as not to respond to the magnetic field for writing on an adjacent magnetic recording layer 22.

With reference to FIG. 3, when a magnetic field H is not applied to the soft magnetic layer having the AFC structure and when the magnetic field H applied thereto is less than the exchange coupling magnetic field Hex, magnetic flux constitutes a closed path between the first soft magnetic layer 114a and the second soft magnetic layer 114c, as shown in (b) in FIG. 3, and magnetization M is zero. When the magnetic field H is applied in a positive or negative direction and the magnetic field H becomes stronger than the exchange coupling magnetic field Hex, magnetic fluxes of the first soft magnetic layer 114a and the second soft magnetic layer 114c are oriented in identical directions, as indicated by arrows shown in (a) and (c) in FIG. 3. This makes it possible to align the directions of magnetization of the soft magnetic layer 114 along the magnetic path (magnetic circuit) with high precision so that perpendicular components of the direction of magnetization are reduced extremely, and thus noise generated from the soft magnetic layer 114 can be reduced.

As described above, due to the soft magnetic layer 114 having the AFC structure, the perpendicular components of the easy axis of magnetization (a perpendicular direction of magnetization) are reduced, but the horizontal components (a horizontal direction of magnetization) still remain irregular. Here, in this embodiment, cross textures in which the angle of intersection between the first textures 110a and the second textures 110b is 10° or less are formed on main surfaces of a glass base on which the soft magnetic layer 114 is formed. This makes it possible to orient the horizontal components of the easy axis of magnetization of the soft magnetic layer 114 in the circumferential direction of the disk base 110, and thus the exchange coupling magnetic field Hex can be enhanced further.

More preferably, the angle of intersection is 3° or more and 8° or less. This makes it possible to enhance the exchange coupling magnetic field Hex further, so that further narrowing of the track width can be achieved.

The preliminary ground layer 116 is a non-magnetic alloy layer, and provided with an effect of protecting the soft magnetic layer 114 and a function of orienting an easy axis of magnetization of a hexagonal close-packed structure (hcp structure) included in the ground layer 118 formed thereon in a direction perpendicular to the disk. It is preferred that the preliminary ground layer 116 have a (111) face of a face-centered cubic structure (fcc structure) parallel to a main surface of the disk base 110. Such a configuration can also be adopted that the preliminary ground layer 116 had these crystalline structures and an amorphous structure in a mixing manner. A material of the preliminary ground layer 116 can be selected from Ni, Cu, Pt, Pd, Zr, Hf, Nb, and Ta. Further, an alloy containing theses metals as a main component and one or more additive elements, Ti, V, Cr, Mo, and W may be adopted. For example, as a preferred alloy having the fcc structure, NiW, CuW, or CuCr can be selected.

Note that the preliminary ground layer 116 is a single layer in this embodiment, but the preliminary ground layer 116 is not limited to this, and may be composed of two or more layers, for example, it is possible to compose the preliminary ground layer 116 of two layers, one disposed closer to the base (formed on the soft magnetic layer 114) of which is amorphous, the other disposed thereon is crystalline.

According to this, amorphous material particles form a film irregularly with no crystalline orientation, and therefore it is possible to smooth and flatten the surface of the soft magnetic layer 114 that has inherited the shape of the textures formed on the main surface of the disk base 110 to have asperity corresponding to the asperity of the textures. Thus, a layer (a coating) formed on the soft magnetic layer 114 can be prevented from inheriting the shape of the textures, so that it becomes possible to prevent reduction in crystalline orientation of the layer formed above the soft magnetic layer, particularly reduction in crystalline orientation of the magnetic particles in the magnetic recording layer 122.

The ground layer 118 has an hcp structure, and has a function of growing a Co crystal in an hcp structure of the magnetic recording layer 122 as a granular structure. Therefore, the higher the crystal orientation of the ground layer 118 is, that is, the more parallel a (0001) face of a crystal of the ground layer 118 is to a main surface of the disk base 110, the more improved the orientation of the magnetic recording layer 122 can be. Though Ru is a typical material of the ground layer 118, RuCr or RuCo can also be selected. Since Ru has an hcp structure and interatomic spacing of the crystal similar to that of Co, the magnetic recording layer 122 having Co as a main component can be well-oriented.

When the ground layer 118 is made of Ru, it can be formed into a two-layer structure made of Ru by changing a gas pressure at a sputtering time. Specifically, the gas pressure of Ar is set at a predetermined pressure, that is, a low pressure, when the first ground layer 118a on a lower layer side is formed, while the gas pressure of Ar is made higher, that is, a higher pressure, when the second ground layer 118b on an upper layer side is formed than when the first ground layer 118a on a lower layer side is formed. This makes it possible for the first ground layer 118a to improve the crystalline orientation of the magnetic recording layer 122, and for the second ground layer 118b to refine particle diameters of the magnetic particles of the magnetic recording layer 122.

Further, since a higher gas pressure makes a mean free path of plasma ions to be sputtered shorter, the film formation rate is delayed and a coating becomes rough, so that separation and refinement of crystal particles of Ru can be promoted, and refinement of crystal particles of Co also becomes possible.

Further, a slight amount of oxygen may be contained in Ru of the ground layer 118. This makes it possible to promote separation and refinement of the crystal particles of Ru further, so that further isolation and refinement of the magnetic recording layer 122 can be achieved. Therefore, in this embodiment, oxygen is contained in the second ground layer of the ground layer 118 composed of two layers that is formed immediately below the magnetic recording layer. That is, the second ground layer is made of RuO. This makes it possible to obtain the above advantage most effectively. Note that oxygen may be caused to be contained by reactive sputtering, but it is preferred that a target containing oxygen be used when sputtering film formation is performed.

The non-magnetic granular layer 120 is a non-magnetic layer having a granular structure. Forming the non-magnetic granular layer 120 on the hcp crystal structure of the ground layer 118 and growing a granular layer of the lower recording layer 122a (that is, the whole of the magnetic recording layer 122) thereon have a function of separating the magnetic granular layer from a stage of initial growth (startup). This makes it possible to promote isolation of the magnetic particles in the magnetic recording layer 122. The composition of the non-magnetic granular layer 120 can be configured in a granular structure by forming a grain boundary between non-magnetic crystal particles made of Co-type alloy by segregation of non-magnetic substances.

In this embodiment, CoCr—$SiO_2$ is used for the non-magnetic granular layer 120. This causes the non-magnetic granular layer 120 to obtain a granular structure, since $SiO_2$ (non-magnetic substances) is segregated between Co-type alloys (non-magnetic crystal particles) so as to form a grain boundary. Note that CoCr—$SiO_2$ is an example, not a limitation. CoCrRu—$SiO_2$ can also be suitably used, and further Rh (rhodium), Pd (palladium), Ag (silver), Os (osmium), Ir (iridium), or Au (gold) can also be utilized in place of Ru. Further, the non-magnetic substance is a substance in which a grain boundary part can be formed around magnetic particles so as to suppress or interrupt a function of exchange interaction between magnetic particles (magnetic grains), and may be any non-magnetic substance as long as it is not solid-soluble with cobalt (Co). Examples can include silicon oxide ($SiO_x$), chrome (Cr), chrome oxide ($Cr_2O_3$), titanium oxide ($TiO_2$), zirconium oxide ($ZrO_2$), and tantalum oxide ($Ta_2O_5$).

Note that the non-magnetic granular layer 120 is provided on the ground layer 188 (the second ground layer 188b) in this embodiment, but this is not a limitation, and it is also possible to configure the perpendicular magnetic recording medium 100 without providing the non-magnetic granular layer 120.

The magnetic recording layer 122 has a columnar granular structure in which a grain boundary is formed by segregation of non-magnetic substances around magnetic particles of a hard magnetic body selected from a Co-type alloy, an Fe-type alloy, or an Ni-type alloy. By providing the non-magnetic granular layer 120, this magnetic particle can grow epitaxially continuing from the granular structure. The magnetic recording layer 122, in this embodiment, is composed of the lower recording layer 122a, the intervening layer 122b, the first main recording layer 122c, and the second main recording layer 122d. This causes small crystal particles of the first main recording layer 122c and the second main recording layer 122d to grow continuously from crystal particles (magnetic particles) of the lower recording layer 122a so that refinement of the main recording layers can be achieved, and therefore improvement in SNR becomes possible.

In this embodiment, CoCrPt—$Cr_2O_5$—$SiO_2$ is used for the lower recording layer 122a. CoCrPt—$Cr_2O_5$—$SiO_2$ forms a granular structure in which a grain boundary is formed due to segregation of $Cr_2O_5$ and $SiO_2$ (oxides), which are non-magnetic substances, around magnetic particles (grains) made of CoCrPt, and in which the magnetic particles are grown into a columnar shape. This magnetic particle is epitaxially grown continuously from the granular structure of the non-magnetic granular layer 120.

The intervening layer 122b is a non-magnetic thin film, the interposition of which between the lower recording layer 122a and the first main recording layer 122c splits magnetic continuity therebetween. At this time, by setting the film thickness of the intervening layer 122b at a predetermined film thickness (0.7 to 0.9 nm), antiferro-magnetic exchange coupling (AFC) is caused between the lower recording layer 122a and the first main recording layer 122c. This causes mutual attraction between magnetizations of layers positioned above and below the intervening layer 122b, which acts to fix the directions of magnetization mutually, so that fluctuation of an axis of magnetization is reduced, which can result in reduction in noise.

The intervening layer 122b may be composed of Ru or a Ru alloy. This is because Ru is close in interatomic spacing to Co constituting magnetic particles and therefore Ru is unlikely to disturb epitaxial growth of the crystal particles of Co even if it is interposed between the magnetic recording layers 122. Also because the intervening layer 122b is extremely thin, the epitaxial growth becomes less likely to be disturbed.

If there is not the intervening layer 122b, the lower recording layer 122a is a magnet continuous with the first main recording layer 122c and the second main recording layer 122d, but here, since they are separated by the intervening layer 122b, the lower recording layer 122a is an independent short magnet. Further, the film thickness of the lower recording layer 122a is reduced so that the aspect ratio of granular magnetic particles becomes short (the direction of the film thickness corresponds to the vertical direction of the easy axis of magnetization in the perpendicular magnetic recording medium 100), and accordingly a diamagnetic field generated inside the magnet becomes strong. Therefore, despite the lower recording layer 122a having hard magnetism, the magnetic moment externally emitted becomes small and thus unlikely to be picked up by the magnetic head. That is, the magnetic recording layer that exerts high coercive force with less noise can be obtained by adjusting the film thickness of the lower recording layer 122a so that the magnetic flux is unlikely to reach the magnetic head, and by setting the magnetic moment (the intensity of the magnet) to such an extent that the lower recording layer 122a has magnetic interaction with the first main recording layer 122c.

In this embodiment, CoCrPt—$SiO_2$—$TiO_2$ is used for the first main recording layer 122c. Therefore, also in the first main recording layer 122c, a granular structure is formed where a grain boundary is formed by segregation of $SiO_2$ and $TiO_2$ (complex oxide), which are non-magnetic substances, around magnetic particles (grains) made of CoCrPt, and in which the magnetic particles are grown in columns.

Further, in this embodiment, the second main recording layer 122d is continuous with the first main recording layer 122c, but different in composition and film thickness therefrom. CoCrPt—$SiO_2$—$TiO_2$—$Co_3O_4$ is used for the second main recording layer 122d. Therefore, also in the second main recording layer 122d, a granular structure is formed where a grain boundary is formed by segregation of $SiO_2$, $TiO_2$, and $Co_3O_4$ (complex oxide), which are non-magnetic substances, around magnetic particles (grains) made of CoCrPt, and in which the magnetic particles are grown in columns.

As described above, in this embodiment, such a configuration is adopted that the second main recording layer 122d contains more oxides than the first main recording layer 122c. This makes it possible to promote separation of crystal particles progressively from the first main recording layer 122c to the second main recording layer 122d.

Further, as described above, a Co oxide is contained in the second main recording layer 122d. There is the fact that mixing $SiO_2$ or $TiO_2$ as an oxide causes oxygen deficiency, and therefore Si ions or Ti ions come to be mixed into the magnetic particles to cause disturbance of the crystalline orientation, which results in reduction in coercive force Hc. Therefore, the second main recording layer 122d is caused to contain a Co oxide, thereby being capable of making the Co oxide serve as an oxygen carrier to compensate for the oxygen deficiency. $Co_3O_4$ has been taken as an example of the Co oxide, but CoO may also be used.

The Co oxide has a larger Gibbs free energy $\Delta G$ than $SiO_2$ or $TiO_2$, and accordingly Co ions and oxygen ions separate easily. Therefore, oxygen separates from the Co oxide preferentially, and compensates for oxygen deficiency generated in $SiO_2$ or $TiO_2$, thereby producing an oxide of ions of Si or Ti so that the oxide is segregated as a grain boundary. Thus, foreign matters, such as Si or Ti, are prevented from coming to be mixed into the magnetic particles, so that disturbance of crystallinity of the magnetic particles due to mixed foreign matters can be prevented. Though it is thought that Co ions left over at this time come to be mixed into the magnetic particles, the magnetic property is not damaged, since the magnetic particles are originally Co alloy. Therefore, the crystallinity and crystalline orientation of the magnetic particles is improved, and it becomes possible to increase the coercive force Hc. Further, since the saturated magnetization Ms is improved, there is the advantage that the overwrite characteristic is also improved.

However, mixing the Co oxide in the magnetic recording layer 122 causes the problem of reduction in SNR. Therefore, by providing the first main recording layer 122c which is not mixed with a Co oxide, as described above, a high coercive force Hc and a high overwrite characteristic can be obtained by the second main recording layer 122d, while a high SNR is secured by the first main recording layer 122c. Note that it is preferred that the film thickness of the first main recording layer 122c is thicker than that of the second main recording layer 122d, and as a preferred example of this, setting can be made such that the first main recording layer 122c is 2 nm in film thickness, while the second main recording layer 122d is 8 nm.

Note that the substances described above of the lower recording layer 122a, the first main recording layer 122c, and the second main recording layer 122d are examples, not limitations. A non-magnetic substance for forming a grain boundary can be, for example, an oxide, such as silicon oxide ($SiO_x$), chrome (Cr), chrome oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$). Further, a nitride, such as BN, or carbide, such as $B_4C_3$, can also be suitably used.

Further, in this embodiment, two kinds of non-magnetic substances (oxides) are used for the lower recording layer 122a and the first main recording layer 122c, and three for the second main recording layer 122d, but this is not a limitation. For example, it is also possible to use one kind of non-magnetic substance or two or more kinds of non-magnetic substances in combination for any one or all of the lower recording layer 122a to the second main recording layer 122d. The kind of non-magnetic substance to be contained at this time has no limitation, but, like this embodiment, it is particularly preferred that $SiO_2$ and $TiO_2$ be contained. Therefore, if the lower recording layer 122a to the second main recording layer 122d are configured as a single layer (when the intervening layer 122b is not provided), unlike this embodiment, it is preferred that the magnetic recording layer be composed of CoCrPt—$SiO_2$—$TiO_2$.

The split layer 124 is a non-magnetic layer provided between the magnetic recording layer 122 (the second main recording layer 122d) and the auxiliary recording layer 126. Note that the split layer 124 is formed so as to be thicker than the intervening layer 122b. This causes ferromagnetic exchange coupling, not antiferro-magnetic exchange coupling, as a magnetic effect between the magnetic recording layer 122 and the auxiliary recording layer 126. This causes the magnetic recording layer 122 to act as a pin layer (magnetization direction fixing layer) to the auxiliary recording layer 126, thereby reducing noise due to the auxiliary recording layer 126, which can result in improvement of SNR.

Further, in this embodiment, the split layer 124 can be composed of a thin film containing Ru, a Ru compound, Ru and oxygen, or Ru and an oxide. This can also reduce the noise due to the auxiliary recording layer 126. It is thought this is because, when the split layer 124 is formed, oxygen contained in the split layer 124 is segregated above the oxide of the magnetic recording layer 122, and Ru is segregated above the magnetic particles, and accordingly the crystal structure of Co of the magnetic recording layer 122 is inherited by Co of the auxiliary recording layer 126.

There are various possible oxides to be contained in Ru of the split layer 124, in particular, a W, Ti, or Ru oxide can be used to improve an electromagnetic conversion characteristic (SNR). For example, the split layer 124 may be RuO, $RuWO_3$, or $RuTiO_2$. Above all, $WO_3$ can achieve a high effect.

It is thought this is because the oxygen contained in Ru is dissociated during sputtering, and the oxygen dissociated also exhibits an effect of oxygen addition. That is, it is preferred that $WO_3$ be used because both the effect of oxygen addition and the effect of oxide addition can be provided. Other examples of the oxide can include oxides, such as silicon oxide ($SiO_x$), chrome (Cr), chrome oxide ($Cr_xO_y$), titanium oxide ($TiO_2$), zirconium oxide ($ZrO_2$), tantalum oxide ($Ta_2O_5$), iron oxide ($Fe_2O_3$), and boron oxide ($B_2O_3$). Further, a nitride, such as BN, or carbide, such as $B_4C_3$, can also be suitably used.

The auxiliary recording layer 126 is a magnetic layer magnetically approximately continuous in an in-plane direction of the main surface of the base. The auxiliary recording layer 126 is required to be adjacent to or close to the magnetic recording layer 122 so as to have magnetic interaction therewith. The material of the auxiliary recording layer 126 can be composed of, for example, CoCrPt, CoCrPtB, or these containing a slight amount of oxides. The auxiliary recording layer 126 aims at adjusting the inverted magnetic domain nucleation magnetic field Hn, and adjusting the coercive force Hc, so that improvement in anti-thermal-fluctuation characteristic, OW characteristic, and SNR is achieved. In order to achieve this aim, it is desired that the auxiliary recording layer 126 is high in perpendicular magnetic anisotropy Ku and saturated magnetization Ms. Note that the auxiliary recording layer 126 is provided above the magnetic recording layer 122 in this embodiment, but it may be provided therebelow.

Note that "magnetically continuous" means that magnetism is continuous. "Approximately continuous" means that, when seen as a whole, the auxiliary recording layer 126 does not have to be a single magnet and may have magnetism discontinuous due to a grain boundary of crystal particles. The grain boundary is not limited to discontinuity of crystals but may be segregation of Cr, and further may be segregation with a slight amount of oxides contained. Note that, also in the case where the grain boundary containing oxides is formed in the auxiliary recording layer 126, it is preferred that the grain boundary be smaller in area than that of the magnetic recording layer 122 (smaller in oxide content). Though the function and effect of the auxiliary recording layer 122 is not necessarily clear, it is thought that, because the auxiliary recording layer 126 has magnetic interaction (performs exchange coupling) with the granular magnetic particles of the magnetic recording layer 122, it can adjust Hn and Hc, thereby improving the anti-thermal-fluctuation characteristic and the SNR. It is also thought that the crystal particle connected (the crystal particle having magnetic interaction) with the granular magnetic particle is larger in area than the cross-section of the granular magnetic particle, and accordingly receives much flux from the magnetic head to become able to perform magnetization reversal easily, thereby improving the whole OW characteristic.

The medium-protective layer 128 can be formed by a carbon film by CVD with a vacuum kept. The medium-protective layer 128 is a layer to protect the perpendicular magnetic recording medium 100 from an impact from the magnetic head. Since a carbon film formed by CVD is generally improved in film hardness as compared with that formed by sputtering, the perpendicular magnetic recording medium 100 can be protected more effectively from an impact from the magnetic head.

The lubricating layer 130 can be formed with PFPE (perfluoropolyether) by dip coating. PFPE has a long-chain molecular structure, and is bonded to N atoms on the surface of the medium-protective layer 128 with high affinity. Owing to this function of the lubricating layer 130, damage and loss of the medium-protective layer 128 can be prevented, even if the magnetic head contacts with the surface of the perpendicular magnetic recording medium 100.

By the above manufacturing process, the perpendicular magnetic recording medium 100 can be obtained. Next, examples of this embodiment will be described.

EXAMPLES

Films of the adhesive layer 112 to the auxiliary recording layer 126 were sequentially formed on the disk base 110 formed with textures in an Ar atmosphere by DC magnetron sputtering with use of a vacuumed film forming device. The adhesive layer 112 was CrTi. As for the soft magnetic layer 114, the compositions of the first soft magnetic layer 114a and the second soft magnetic layer 114c were CoFeTaZr, and the composition of the spacer layer 114b was Ru. The composition of the preliminary ground layer 116 was NiW. As for the first ground layer 118a, a Ru film was formed in an Ar atmosphere at a predetermined pressure (low pressure: for example, 0.6 to 0.7 Pa). As for the second ground layer 118b, a Ru (RuO) film containing oxygen was formed in an Ar atmosphere at a higher pressure than the predetermined pressure (high pressure: for example, 4.5 to 7 Pa) with use of a target containing oxygen. The composition of the non-magnetic granular layer 120 was non-magnetic CoCr—$SiO_2$. As for the preliminary recording layer 122a, an hcp crystal structure of CoCrPt—$Cr_2O_5$—$SiO_2$ was formed, where $Cr_2O_5$ and $SiO_2$ were contained as examples of oxides in the grain boundary part. The intervening layer 122b was formed from Ru. As for the first main recording layer 122c, an hcp crystal structure of CoCrPt—$SiO_2$—$TiO_2$ was formed, where $SiO_2$ and $TiO_2$ were contained as an example of a complex oxide (plural kinds of oxides) in the grain boundary part. As for the second main recording layer 122d, an hcp crystal structure of CoCrPt—$SiO_2$—$TiO_2$—$Co_3O_4$ was formed, where $SiO_2$, $TiO_2$, and $Co_3O_4$ were contained as an example of a complex oxide (plural kinds of oxides) in the grain boundary part. The split layer 124 was formed from $RuWO_3$. The composition of the auxiliary recording layer 126 was CoCrPtB. As for the medium-protective layer 128, a film was formed with use of $C_2H_4$ and CN by CVD, and the lubricating layer 130 was formed with use of PFPE by dip coating.

Figure 4:
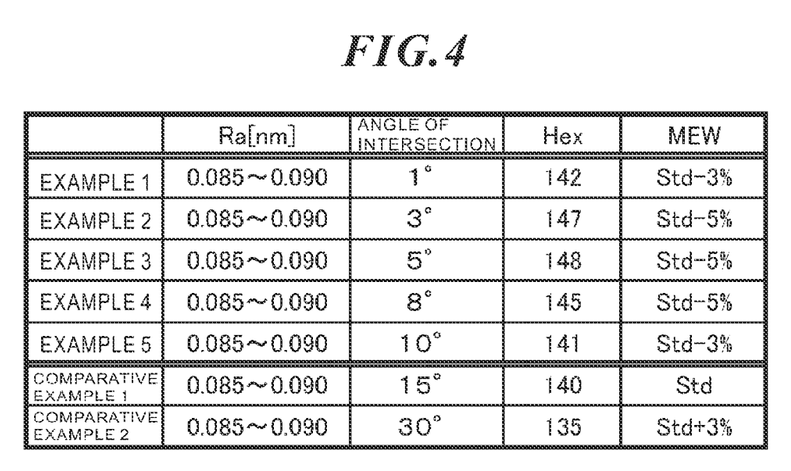
FIG. 4 is a table for describing the evaluations of perpendicular magnetic recording media according to examples and comparative examples.

FIG. 4 is a table for describing evaluations of perpendicular magnetic recording media according to examples and comparative examples. In each of Examples 1 to 5 and Comparative Examples 1 and 2, textures having a surface roughness Ra of 0.085 to 0.090 [nm] were formed. In Examples 1 to 5, cross textures with an angle of intersection of 1°, 3°, 5°, 8°, and 10°, respectively, were formed. In Comparative Examples 1 and 2, cross textures with an angle of intersection of 15° and 30°, respectively, were formed. Then, the exchange coupling magnetic field Hex and MEW (Magnet Erase Width) of each of them were measured. MEW is a track width including an erase width. Note that "Std" in the table is based on a MEW of a perpendicular magnetic recording medium without cross textures (straight textures) (the straight textures are not shown).

With reference to FIG. 4, it can be seen that, by setting the angle of intersection in the range of 1° to 10°, as in the cases of Examples 1 to 5, the exchange coupling magnetic field Hex could be enhanced, and the MEW could be made narrower than in the case without cross textures (Std). It can also be seen that, in Examples 1 to 5, the exchange coupling magnetic field Hex and the MEW reached their respective peaks at some angle of intersection. Like the case of Examples 2 to 8, when the angle of intersection falls in a range of 3° and 8°, the exchange coupling magnetic field Hex was highest, and the MEW was also extremely narrowed. On the other hand, at angles of intersection of 1° (Example 1) and 10° (Example 5), both the exchange coupling magnetic field Hex and the MEW were approximately equal. From this, it can be understood that it is further preferred that the angle of intersection be set in the range of 3° to 8°.

On the other hand, at an angle of intersection of 15° (Comparative Example 1), the MEW was approximately equal to those in the case without cross textures. Further, at an angle of intersection of more than that, 30° (Comparative Example 2), the MEW decreased. Therefore, it can be seen that, when the angle of intersection exceeds 10°, the exchange coupling magnetic field Hex decreases as the angle of intersection increases, which causes increase in MEW.

From the above, it could be confirmed that, by setting the angle of intersection (crossing angle) of cross textures at 10° or less, more preferably in the range of 3° to 8°, a narrower track width could be achieved and thus a higher recording density could be achieved.

The preferred Examples of the present invention have been described above with reference to the appended drawings, but it goes without saying that the present invention is not limited to the embodiment. It is obvious that a person skilled in the art can arrive at various modifications or alterations within the scope of claims, and those are of course understood as belonging to the technical scope of the present invention.

The present invention is applicable as a perpendicular magnetic recording medium installed in an HDD or the like of a perpendicular magnetic recording type.

DESCRIPTION OF REFERENCE NUMERALS

100: Perpendicular magnetic recording medium
102: Spindle
104: Slurry nozzle
106: Polishing tape
108: Roller
110: Disk base
110a: First texture
110b: Second texture
112: Adhesive layer
114: Soft magnetic layer
114a: First soft magnetic layer
114b: Spacer layer
114c: Second soft magnetic layer
116: Preliminary ground layer
118: Ground layer
118a: First ground layer
118b: Second ground layer
120: Non-magnetic granular layer
122: Magnetic recording layer
122a: Lower recording layer
122b: Intervening layer
122c: First main recording layer
122d: Second main recording layer
124: Split layer
126: Auxiliary recording layer
128: Medium-protective layer
130: Lubricating layer

The invention claimed is:

1. A perpendicular magnetic recording medium comprising a magnetic recording layer that records a signal, and a soft magnetic layer provided below the magnetic recording layer, on a base on a main surface of which textures are formed, wherein the textures comprise first textures that are linear trails intersecting with a circumferential direction of the base at a first angle, and second textures that are linear trails intersecting at a predetermined angle with the first textures, the second textures intersecting with the circumferential direction of the base at a second angle that is different from the first angle;

the base has a surface roughness Ra of 0.085 nm to 0.09 nm; and the angle of intersection between the first textures and the second textures is from 3° to 8°.

2. The perpendicular magnetic recording medium according to claim 1, wherein the textures are formed by relative movement between the base and a polishing tape that polishes the main surface of the base.

* * * * *